US011435009B2

(12) United States Patent
Fang

(10) Patent No.: US 11,435,009 B2
(45) Date of Patent: Sep. 6, 2022

(54) HINGED VALVE

(71) Applicant: SHANGHAI HONGYAN RETURNABLE TRANSIT PACKAGINGS CO., LTD., Shanghai (CN)

(72) Inventor: Zhengwei Fang, Shanghai (CN)

(73) Assignee: SHANGHAI HONGYAN RETURNABLE TRANSIT PACKAGINGS CO., LTD., Shanghai (CN)

(*) Notice: Subject to any disclaimer, the term of this patent is extended or adjusted under 35 U.S.C. 154(b) by 0 days.

(21) Appl. No.: 17/254,784

(22) PCT Filed: Jun. 18, 2019

(86) PCT No.: PCT/CN2019/091726
§ 371 (c)(1),
(2) Date: Dec. 21, 2020

(87) PCT Pub. No.: WO2019/242609
PCT Pub. Date: Dec. 26, 2019

(65) Prior Publication Data
US 2021/0262584 A1    Aug. 26, 2021

(30) Foreign Application Priority Data
Jun. 21, 2018  (CN) .......................... 201810643137.7

(51) Int. Cl.
*F16K 35/00* (2006.01)
*F16K 1/20* (2006.01)

(52) U.S. Cl.
CPC ................ *F16K 35/00* (2013.01); *F16K 1/20* (2013.01)

(58) Field of Classification Search
CPC ...... F16K 27/0227; F16K 1/20; F16K 1/2014; F16K 1/523; F16K 31/52441;
(Continued)

(56) References Cited

U.S. PATENT DOCUMENTS

| 257,449 A | * | 5/1882 | Pratt | ....................... F16K 3/184 |
| | | | | 137/583 |
| 2,099,069 A | * | 11/1937 | Lowe | ................... A62C 35/645 |
| | | | | 169/17 |

(Continued)

FOREIGN PATENT DOCUMENTS

| CN | 103090023 | 5/2013 |
| CN | 103363127 | 10/2013 |

(Continued)

OTHER PUBLICATIONS

International Search Report and Written Opinion; International Patent Application No. PCT/CN2019/091726, with English translation of Search Report, dated Sep. 19, 2019 (9 pages).

*Primary Examiner* — Craig J Price
(74) *Attorney, Agent, or Firm* — Hamre, Schumann, Mueller & Larson, P.C.

(57) ABSTRACT

A hinged valve is provided. The hinged valve includes a valve body, a valve stem, a valve disc, an actuator and a sliding member. The valve body is a housing, which is provided with a valve stem hole for partially accommodating the valve stem. The valve body has a passage with an inlet and an outlet. The valve disc is connected to the valve body through a hinge, so that the valve disc is able to rotate around the rotation axis of the hinge.

16 Claims, 11 Drawing Sheets

(58) Field of Classification Search
CPC ...... F16K 31/521; F16K 31/563; F16K 35/00; F16K 1/2007; F16K 31/54; F16K 31/60; F16K 1/2035; F16K 1/22; F16K 1/32; F16K 1/36; F16K 27/0218; F16K 31/602; F16K 39/028; Y10T 137/7069–7256; E05B 65/006; E05B 65/0089
USPC .... 137/15.02, 15.07, 300, 614.2, 527–527.8, 137/383, 384.2, 385; 251/89–116, 228, 251/292, 298, 308; 70/175–179
See application file for complete search history.

(56) References Cited

U.S. PATENT DOCUMENTS

| | | | | |
|---|---|---|---|---|
| 2,506,468 | A * | 5/1950 | Rider | A62C 35/605 |
| | | | | 169/19 |
| 3,792,833 | A * | 2/1974 | Rosin | F16K 1/2014 |
| | | | | 251/11 |
| 4,073,470 | A * | 2/1978 | Harris | F16K 1/24 |
| | | | | 251/161 |
| 4,658,857 | A | 4/1987 | Ayres, Jr. | |
| 6,000,473 | A * | 12/1999 | Reilly | F16K 15/1821 |
| | | | | 169/17 |
| 6,029,749 | A * | 2/2000 | Reilly | A62C 35/62 |
| | | | | 169/17 |
| 6,112,762 | A * | 9/2000 | Dean | B60P 3/224 |
| | | | | 105/377.11 |
| 7,673,695 | B2 * | 3/2010 | Deurloo | F16K 15/1821 |
| | | | | 169/17 |
| 8,387,659 | B2 * | 3/2013 | Hunnicutt | F15B 13/0402 |
| | | | | 137/625.35 |
| 8,733,381 | B2 * | 5/2014 | Peyton | E03B 9/16 |
| | | | | 137/15.02 |
| 9,004,448 | B2 * | 4/2015 | Qian | F16K 5/204 |
| | | | | 251/188 |
| 9,534,693 | B2 * | 1/2017 | Qian | F16K 31/60 |
| 9,752,692 | B2 * | 9/2017 | Abouelleil | F16K 15/144 |
| 9,901,763 | B2 * | 2/2018 | Meyer | F16K 31/002 |
| 10,001,218 | B2 * | 6/2018 | Fang | F16K 1/2007 |
| 10,201,723 | B2 * | 2/2019 | Deurloo | A62C 35/68 |

FOREIGN PATENT DOCUMENTS

| | | |
|---|---|---|
| CN | 204437307 | 7/2015 |
| CN | 204437307 U | 7/2015 |
| CN | 108679241 | 10/2018 |
| CN | 108679242 | 10/2018 |
| CN | 208793644 | 4/2019 |
| CN | 208793645 | 4/2019 |
| WO | 2017125075 A1 | 7/2017 |

\* cited by examiner

HINGED VALVE

CROSS-REFERENCE OF RELATED APPLICATION

This application claims the priority of Chinese patent application No. 2018106431377, entitled "Hinged valve", filed on Jun. 21, 2018, the entire disclosure thereof is incorporated herein by reference.

TECHNICAL FIELD

The present invention relates to a valve, and in particular to a hinged valve.

BACKGROUND OF THE INVENTION

The opening way of existing valves for intermediate bulk containers, such as butterfly valves, is that the middle rotating shaft of the valve disc is rotated, which drives both sides of the valve disc to rotate to open. Because the valve disc is generally located inside the valve body, its flow is affected by the valve disc and the rotating shaft; and the sealing is poor. Because of the friction between the sealing ring and the valve body of the butterfly valve, the resistance force for opening and closing the valve is great.

Although there are still some hinged valves that have lower resistance force for opening and closing, these valves may be unintentionally opened or their sealing may be unintentionally damaged, resulting in unintentional leakage.

SUMMARY OF THE INVENTION

An object of the present invention is to provide a hinged valve that can be locked more reliably, and preferably is able to be sealed more reliably.

In order to achieve the above object, the present application provides an hinged valve comprising a valve body, a valve stem, a valve disc, an actuator, and a sliding member, wherein the valve body is a housing, which is provided with a valve stem hole for partially accommodating the valve stem, and the valve has a passage with an inlet and an outlet, the valve disc is connected to the valve body through a hinge, so that the valve disc is rotatable around a rotation axis of the hinge, wherein the actuator cooperates with the sliding member, so that the rotational movement of the valve stem is transmitted to the valve disc through the actuator via the sliding member and is converted into a movement that drives the valve disc to rotate around the rotation axis of the hinge to open or close the valve, the valve disc is provided with a locking post, a bottom end of the valve stem is provided with a locking hook, and the locking post is provided with a locking boss, the locking hook is provided with a locking-ledge, when the valve is in the closed state, the valve disc is locked to the valve body by the locking hook and the locking post, and the locking-ledge on the locking hook and the locking boss on the locking post cooperate with each other.

In an embodiment, the locking boss is located on an upper portion of the locking post and protrudes outward relative to the locking post, and the locking-ledge extends from a lower portion of the locking hook transversely to the locking hook.

In an embodiment, an outer edge of the locking-ledge is an arc-shaped curved surface, and a middle portion of the outer edge is concave relative to both sides.

In an embodiment, the valve body has a flange located at one end of the valve body, and the valve body is further provided with a reinforcing protrusion extending radially outward along the valve body, and a force-relieving groove is provided between the reinforcing protrusion and the flange.

In an embodiment, a width of the force-relieving groove is ⅕-½ of the thickness of a reinforcing protrusion.

In an embodiment, the thickness of the root of the flange is greater than that of the distal end of the flange.

Preferably, the thickness of a root of the flange is 1.5-2.5 times that of the distal end of the flange. In an embodiment, the thickness of at least a part of a segment of the flange defining the force-relieving groove is greater than that of the rest part of the flange.

In an embodiment, a sealing surface facing the valve disc is provided in the valve body, which is closer to the outlet of the valve than the reinforcing protrusion.

In an embodiment, the actuator is provided with a pushing-out contour and a pulling-back contour, and the sliding member is rotatably connected with the valve disc and is provided with an opening guiding post and an pulling-back guiding post for respectively cooperating with the pushing-out contour and the pulling-back contour; the pushing-out contour cooperates with the opening guiding post during the valve opening, so that the rotational movement of the valve stem is transmitted to the valve disc through the actuator via the sliding member and converted into the movement that drives the valve disc to rotate around the rotation axis of the hinge to open the valve; the pulling-back contour cooperates with the pulling-back guiding post during the valve closing, so that the rotational movement of the valve stem is transmitted to the valve disc through the actuator via the sliding member and is converted into the movement that drives the valve disc to rotate around the rotation axis of the hinge to close the valve.

In an embodiment, the valve disc is provided with a connecting hole, the sliding member is provided with a rotating shaft, and the rotating shaft is connected to the connecting hole, thus the sliding member is rotatably connected to the valve disc.

In an embodiment, the actuator includes a fixed end for connecting with the valve stem and a guiding end that cooperates with the sliding member, the outer surfaces on both sides of the guiding end are respectively provided with the pushing-out contour and the pulling-back contour.

In an embodiment, an auxiliary pulling-back protrusion protruding from the outer side wall of the actuator is further provided between the fixed end and the pushing-out contour, wherein the auxiliary pulling-back protrusion and the pulling-back contour respectively cooperate with the opening guiding post and the pulling-back guiding post during the valve closing.

In an embodiment, the pushing-out contour is provided with a pushing-out portion and a limiting portion in sequence, so that during the valve opening, the pushing-out portion cooperates with the opening guiding post to push the sliding member to move, thereby driving the valve disc to make an opening movement, and when the valve is completely opened, the opening guiding post of the sliding member is disengaged from the pushing-out portion and enters into the limiting portion.

In an embodiment, the actuator is further provided with a positioning post and an elastic buckle, the bottom end of the valve stem is provided with a positioning hole above the locking post, and the positioning post of the actuator is connected to the positioning hole of the valve stem and elastically assembled with the stem body of the valve stem under the action of the elastic buckle of the actuator, causing the actuator and the valve stem to be connected to form a relatively stationary assembly capable of synchronous movement.

In an embodiment, the elastic buckle is located on both sides of the positioning post, and when assembled, the outer contour on the same side as the pulling-back contour of the elastic buckle exceeds the outer contour of the sliding member.

In an embodiment, the sliding member has a U-shaped body, the rotating shaft is provided at the ends of the two arms of the U-shaped body, and the opening guiding post and the pulling-back guiding post are provided on the same arm of the two arms of the U-shaped body and spaced apart from each other.

In an embodiment, the opening guiding post and the pulling-back guiding post and the arm of the U-shaped body provided with the opening guiding post and the pulling-back guiding post together form a square opening or a square-shaped structure.

In an embodiment, the sliding member is integrally formed of an elastic material.

In an embodiment, the outer wall of the valve stem hole is provided with two limiting bosses spaced apart by a certain angle, and the upper outer wall of the valve stem is integrally protrudingly provided with a limiting boss and a locking protrusion, which respectively cooperate with the two limiting bosses to achieve the maintenance of an opened state of the valve and prevent the valve stem from rotating beyond a predetermined angle.

In an embodiment, the valve disc has a disc-shaped body, the side of the body facing the passage is provided with the locking post, and above the locking post, two protrusions protrude from the side of the valve disc, connecting holes for accommodating the rotating shaft of the sliding member are provided in the two protrusions respectively.

Another object of the present invention is to provide a hinged valve that can be locked more reliably and is able to be sealed more reliably.

To achieve this objective, the present invention provides a hinged valve comprising a valve body, a valve stem, a valve disc, an actuator and a sliding member, wherein the valve body is a housing which is provided with a valve stem hole for partially accommodating the valve stem, and the valve body has a passage with an inlet and an outlet, the valve disc is connected to the valve body through a hinge so that the valve disc is rotatable around a rotation axis of the hinge, and the valve disc is provided with a locking post, a bottom end of the valve stem is provided with a locking hook, wherein the actuator is provided with a pushing-out contour and a pulling-back contour and is connected with the valve stem to form a relatively stationary assembly capable of moving synchronously; the sliding member is rotatably connected to the valve disc and is provided with an opening guiding post and a pulling-back guiding post that respectively cooperate with the pushing-out contour and the pulling-back contour, wherein the locking post is provided with a locking boss, and the locking hook is provided with a locking-ledge, wherein the pushing-out contour cooperates with the opening guiding post during the valve opening, so that a rotational movement of the valve stem is transmitted to the valve disc through the actuator via the sliding member and is converted into the movement that drives the valve disc to rotate around the rotation axis of the hinge to open the valve; the pulling-back contour cooperates with the pulling-back guiding post during the valve closing, so that the rotational movement of the valve stem is transmitted to the valve disc through the actuator via the sliding member and is converted into the movement that drives the valve disc to rotate around the rotation axis of the hinge to close the valve, when the valve is in the closed state, the valve disc is locked to the valve body by the locking hook and the locking post, and the locking-ledge on the locking hook and the locking bosses on the locking post engage with each other;

the locking boss is located on an upper portion of the locking post and protrudes outward relative to the locking post, and the locking-ledge extends from a lower portion of the locking hook transversely to the locking hook; and the valve body has a flange located at one end of the valve body, the valve body is further provided with a reinforcing protrusion radially extending outward along the valve body, and a force-relieving groove is provided between the reinforcing protrusion and the flange.

In an embodiment, the actuator includes a fixed end for connecting with the valve stem and a guiding end that cooperates with the sliding member, and the outer surfaces on both sides of the guiding end are respectively provided with the pushing-out contour and the pulling-back contour; and an auxiliary pulling-back protrusion protruding from the outer side wall of the actuator is further provided between the fixed end and the pulling-back contour, wherein the auxiliary pulling-back protrusion and the pulling-back contour respectively cooperate with the opening guiding post and the pulling-back guiding post during closing of the valve.

In an embodiment, the thickness of a root of the flange is greater than that of the distal end of the flange.

In an embodiment, an inside of the valve body there is provided with a sealing surface facing the valve disc, wherein the sealing surface is closer to the outlet of the valve than the reinforcing protrusion.

The valve of the present invention can provide more reliable locking and more reliable sealing.

THE DETAILED DESCRIPTIONS OF THE PREFERRED EMBODIMENTS

The preferred embodiments of the present invention will be described in detail below with reference to the accompanying drawings, so that the purposes, features and advantages of the present invention can be more clearly understood. It should be understood that the embodiments shown in the accompanying drawings are not intended to limit the scope of the present invention, and is only used for illustrating the essential spirit of the technical solution of the present invention.

In the following description, for the purpose of illustrating various disclosed embodiments, some specific details are set forth to provide a thorough understanding of various disclosed embodiments. However, those skilled in the relevant art will recognize that the embodiments may be embodied without one or more of these specific details. In other situations, well-known devices, structures, and technologies associated with the present application may not be shown or described in detail to avoid unnecessarily obscuring the description of the embodiments.

Unless the context has other requirement, throughout the specification and claims, the words "comprising" and its variations, such as "including" and "having" should be understood as open and inclusive meanings, that is, should be interpreted as "including, but not limited to".

Throughout the specification, reference to "one embodiment" or "an embodiment" means that a specific feature, structure, or characteristic described in combination with the embodiment is involved in at least one embodiment. Therefore, the appearances of "in one embodiment" or "in an embodiment" in various positions throughout the specification are not all refer to the same embodiment. In addition, specific features, structures, or characteristics may be combined in any manner in one or more embodiments.

As used in this specification and the appended claims, the singular forms "a" and "the" include plural referents unless the context clearly dictates otherwise. It should be noted that the term "or" is usually used in its meaning including "and/or", unless the context clearly stipulates otherwise.

In the following description, in order to clearly demonstrate the structure and working mode of the present invention, many directional words will be used for description, but the words "front", "rear", "left", "right", "outer", "inner", "outward", "inward", "upper", "lower" and other words should be understood as convenient terms and should not be understood as restrictive terms.

Figure 1:
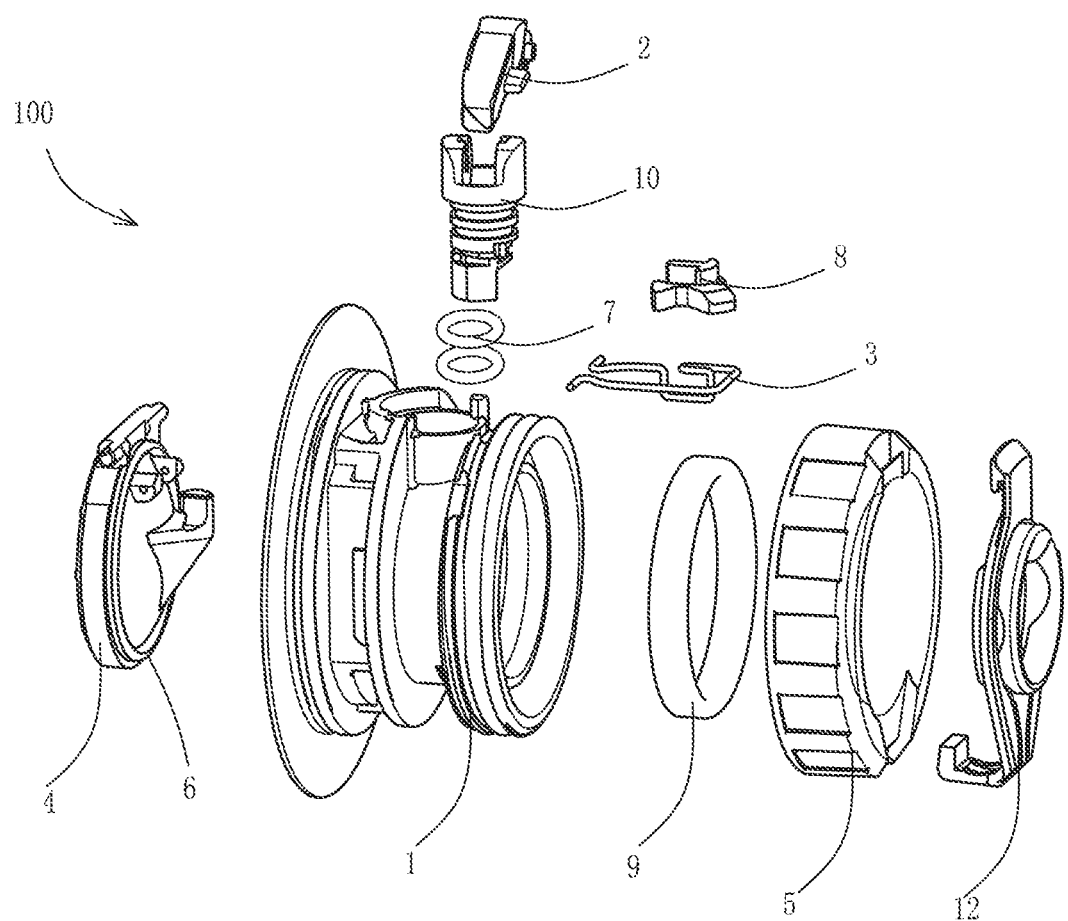
FIG. 1 shows an explosive perspective view of the hinged valve according to the present invention.
Figure 2:
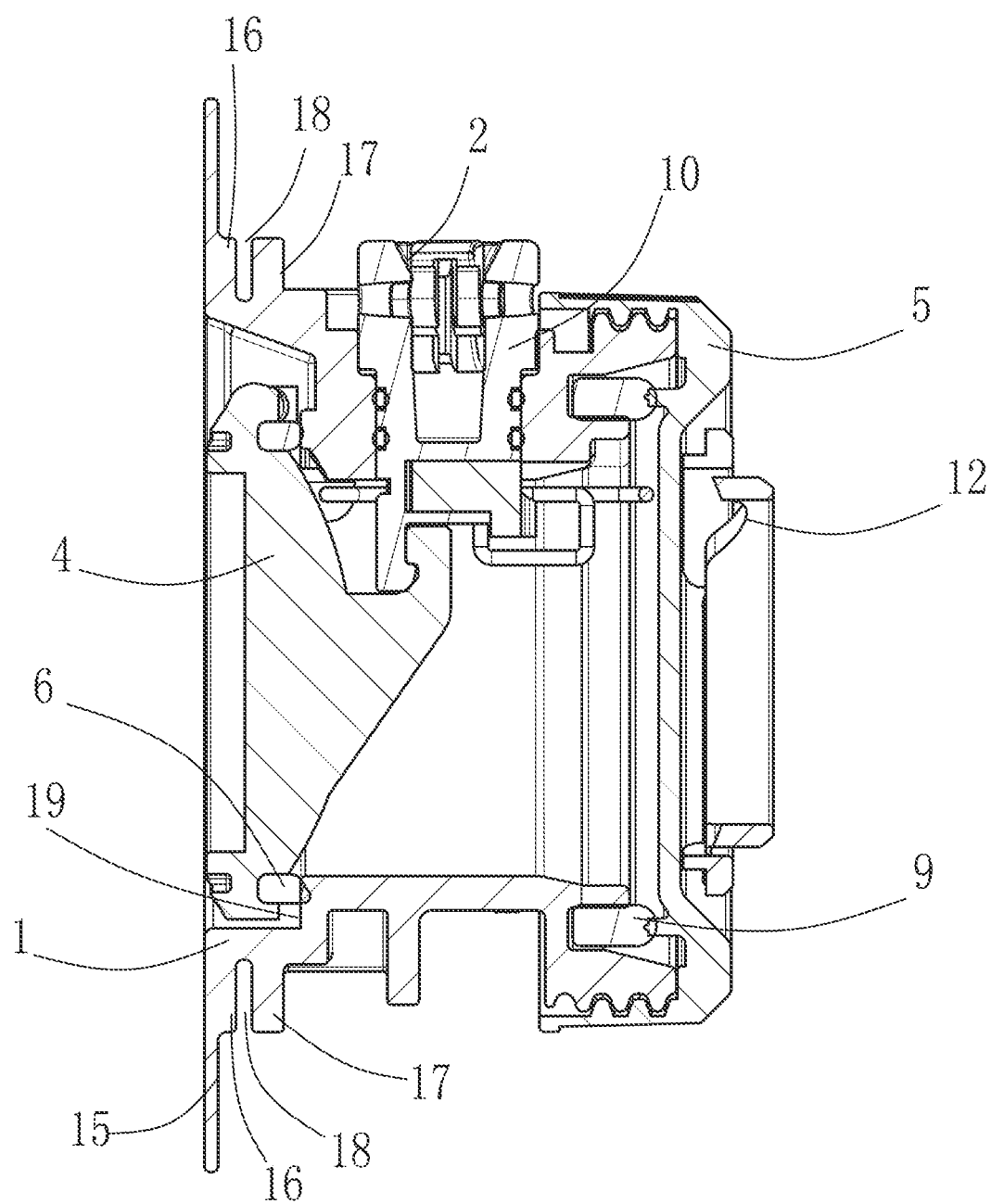
FIG. 2 is a cross-sectional view of the hinged valve with the valve in a closed state.

FIGS. 1 and 2 show a hinged valve 100 according to a first embodiment of the invention. As shown in FIGS. 1-2, the valve 100 includes a valve body 1, a handle 2, a sliding member 3, a valve disc 4, a valve cover 5, sealing rings 6, 7, a valve seat 9, an actuator 8 and a valve stem 10. The valve disc 4 is connected to the valve body 1 through a hinge. The hinge is consisted of a hinge shaft provided on the valve disc 4 and a hinge hole provided on the valve body 1, which will be described in more detail below. A sealing ring 6 is provided between the valve disc 4 and the valve body 1. The handle 2 is connected to the valve stem 10 through a handle pin 11. The valve stem 10 is connected to the valve disc 4 through the sliding member 3 and the actuator 8. The sliding member 3 and the actuator 8 function to transmit the movement of the valve stem to the valve disc 4, so that when the handle 2 is rotated, the handle 2 drives the valve stem 10 to rotate, and then the valve stem drives the actuator 8 and the sliding member 3 to move, the movement of sliding member 3 in turn drives the valve disc 4 to move to realize the opening and closing of the valve. A sealing ring 7 is provided between the valve stem 10 and the valve body 1. A valve seat 9 is also provided between the valve body 1 and the valve cover 5. The valve cover 5 may further be provided with an anti-tamper buckle 12.

In addition, the valve stem 10 is provided with a locking hook. The valve disc is provided with a locking post. The valve disc is locked to the valve body through the cooperation of the locking hook and the locking post, so as to realize the tight closing of the valve, which will be further described below.

Figure 3:
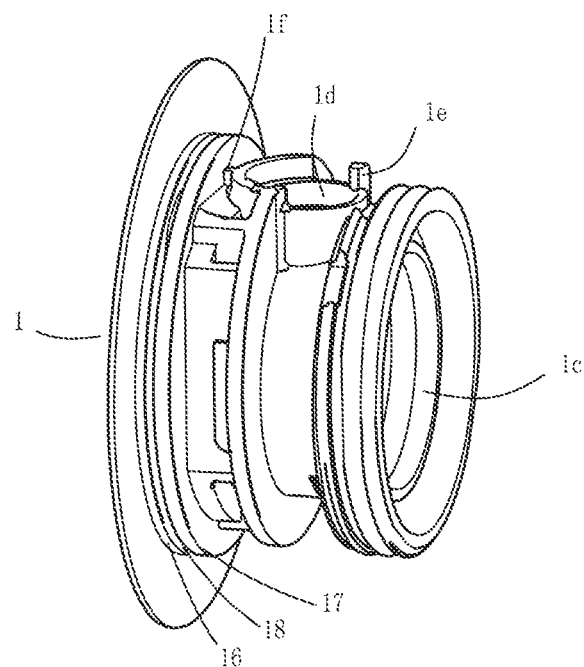
FIG. 3 shows a perspective view of the valve body of the valve according to the present invention.
Figure 4:
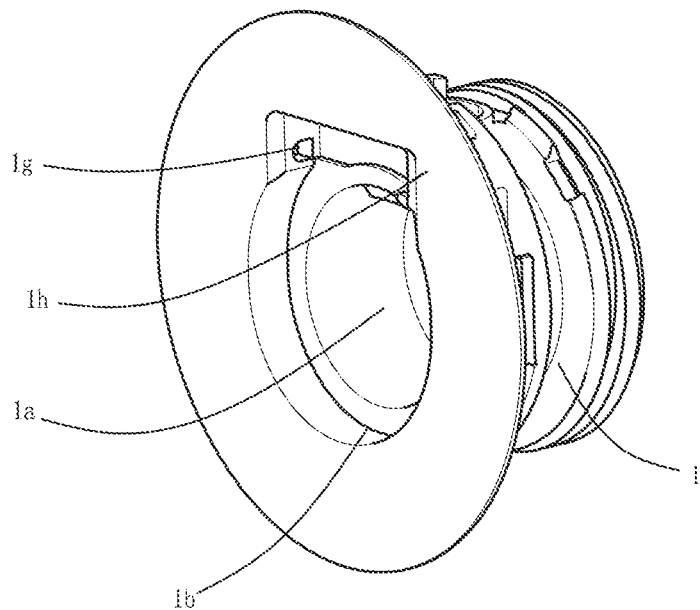
FIG. 4 shows another perspective view of the valve body of the valve according to the present invention.

FIGS. 3-4 show a perspective view of the valve body 1 of the first embodiment of the valve 100 according to the present invention. As shown in FIGS. 3-4, the valve body 1 includes a housing. A passage 1a is formed in the housing for fluid to pass through. An inlet 1b and an outlet 1c communicating with the container and the outside are respectively formed on the left and right sides of the housing along a horizontal axis (not shown). A valve disc 4 is provided at its inlet 1b. The outlet 1c is connected with the valve cover. A valve stem hole 1d is formed on the upper end of the valve body 1 along a vertical axis (not shown) perpendicular to the horizontal axis. The outer wall of the part provided with the valve stem hole 1d is provided with limiting bosses 1e and 1f spaced apart by a certain angle. Hinge holes 1g and 1h are provided above the passage 1a at the inlet 1b of the valve body 1.

A flange 15 is provided at one end of the valve body 1 where the valve disc is installed. A first reinforcing platform 16 is provided at the root of the flange 15. In this embodiment, the first reinforcing platform 16 is integrally formed at the root of the flange 15. In such a condition, the root of the flange 15 is the first reinforcing platform. The thickness of the root of the flange 15 is greater than that of the distal end of the flange 15. Preferably, the thickness of the root of the flange 15 is 1.5-3 times that of the distal end of the flange. More preferably, the thickness of the root of the flange 15 is 2-3 times that of the distal end of the flange. Here, the root of the flange refers to a segment of the flange that is adjacent to the outer wall of the valve in the portion of the flange radially beyond the outer wall of the valve body. It should be understood that the first reinforcing platform may also be formed separately from the flange independently.

The valve body 1 is further provided with a reinforcing protrusion 17 extending outwardly from the outer wall of the valve body 1 in the radial direction of the valve body, which is also called a second reinforcing platform 17. A force-relieving groove 18 is provided between the reinforcing protrusion 17 and the flange 15. In an embodiment, the thickness of at least a part of a segment of the flange 15 defining the force-relieving groove is greater than that of the rest. In an embodiment, the width of the force-relieving groove 18 is ⅕-⅔ of the thickness of the reinforcing protrusion 17. More preferably, the width of the force-relieving groove 18 is ⅓-½ of the thickness of the reinforcing protrusion 17. In this embodiment, the reinforcing protrusion is formed as a peripheral protrusion, and the force-relieving is formed as a peripheral groove. It should be understood that the reinforcing protrusions may also be discontinuously distributed on the housing of the valve body. Similarly, the force-relieving grooves may also be discontinuously distributed in the housing of the valve body. When the valve flange is under stress, the first reinforcing platform, the second reinforcing platform and the force-relieving groove will transfer the received force to each component, so as not to affect the sealing surface of the valve body, and the sealing stability is guaranteed.

Inside of the valve body 1 there is provided with a sealing surface 19. The sealing surface 19 faces the valve disc and is used to cooperate with the sealing ring 6. The sealing surface is perpendicular to the center axis of the valve. Here, the central axis refers to the axis from the inlet to the outlet of the valve. In the closed state, the sealing ring 6 abuts against the sealing surface 19 to realize the sealing of the valve. The sealing surface 19 is closer to the outlet 1c of the valve than the reinforcing protrusion 17, as shown in FIG. 2. As a result, the deformation of the flange has the least impact on the tightness.

Figure 5:
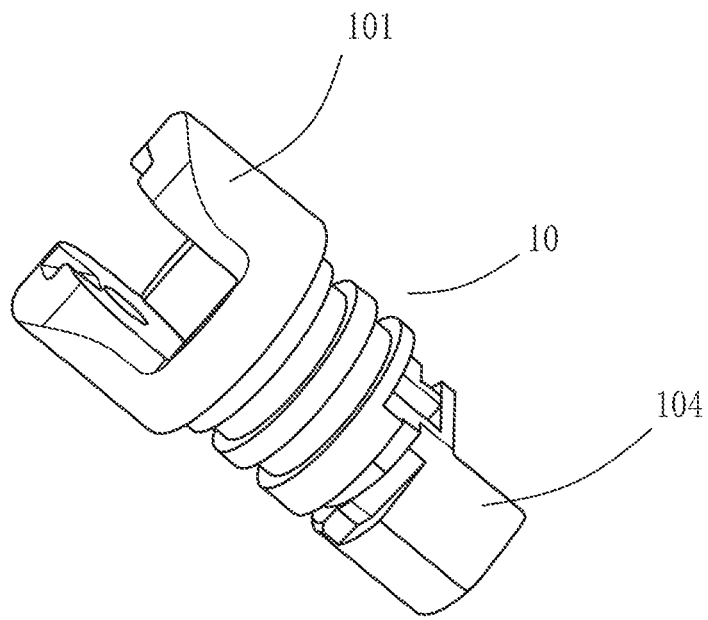
FIG. 5 shows a perspective view of the valve stem of the valve according to the present invention.
Figure 6:
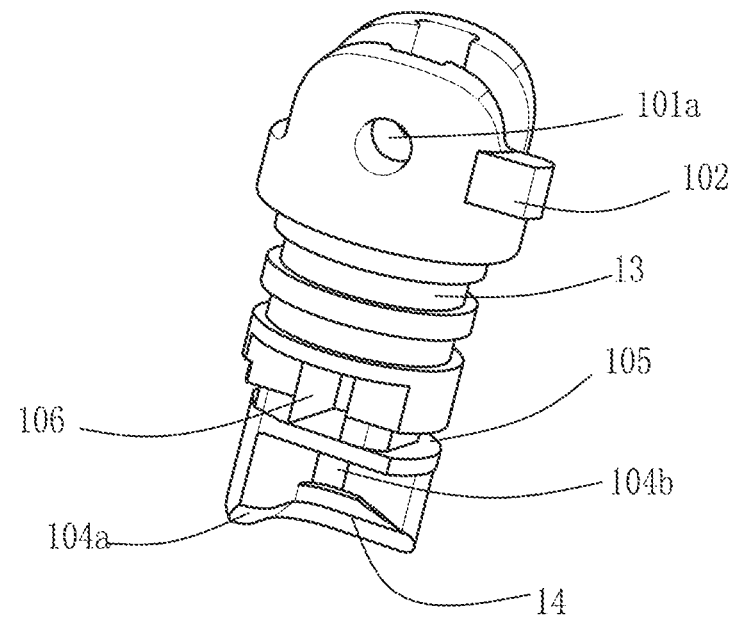
FIG. 6 shows another perspective view of the valve stem of the valve according to the present invention.

FIGS. 5-6 show perspective views of the valve stem 10 of the valve 100. The valve stem 10 is partially accommodated in the valve stem hole 1d, and the upper portion of the valve stem is formed with a lug 101 and pin holes 101a in the lug 101 for cooperating with the handle 2 and the handle pins 11 respectively. A limiting platform 102 is integrally protrudingly provided on the outer wall of the upper portion of the valve stem. The limiting platform 102 cooperates with the limiting bosses 1e, 1f on the valve body 1 to prevent the valve stem from rotating beyond a predetermined angle.

A sealing groove 13 is provided at the middle portion of the valve stem immediately adjacent to the upper portion. The sealing groove is used to accommodate the sealing ring 7 to seal between the valve stem and the valve body. The middle or lower portion of the valve stem 10 is formed with a limiting step 105 and a positioning hole 106 in the radial direction of the valve stem. The limiting step 105 and the positioning hole 106 are used to cooperate with the actuator 8 so that the actuator 8 is fixedly held on the valve stem 10, thus after the valve is assembled, the actuator 8 will not fall off from the valve stem 10 without artificially disassembling. This will be explained in more detail below.

A locking hook 104 is integrally provided on the bottom end of the valve stem 10. The locking hook 104 is used to keep the valve disc 4 in the closed state when the valve is closed. The locking hook 104 is a hook-like structure, and the locking hook is provided with a starting inclined surface 104a for guiding. The middle portion 104b of the locking hook 104 is concave relative to both sides. A locking-ledge 14 extends from the lower portion of the locking hook transversely to the locking hook. The outer edge of the locking-ledge is an arc-shaped curved surface, and the middle portion of the outer edge is concave relative to both sides. In the locked state, the locking-ledge 14 is engaged with the locking boss on the locking post to prevent the locking hook from intentionally leaving the locking post. The locking hook is used to cooperate with the locking post on the disc 4 to achieve locking when the valve is closed, which will be described in more detail below.

Figure 7:
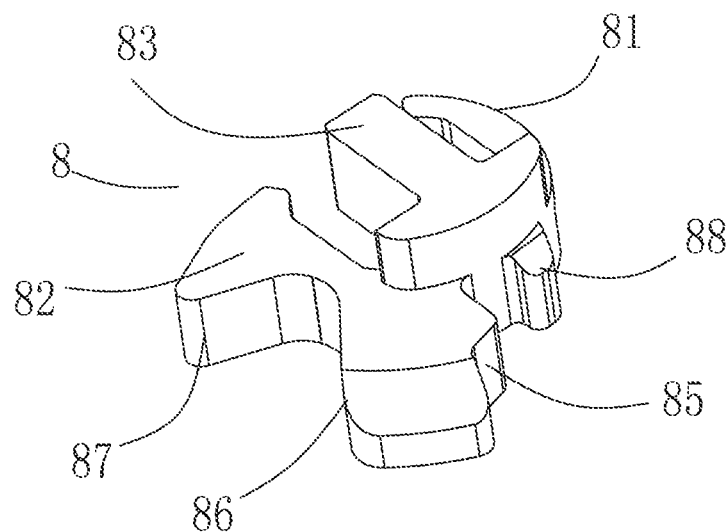
FIG. 7 shows a perspective view of the actuator of the valve according to the present invention.
Figure 8:
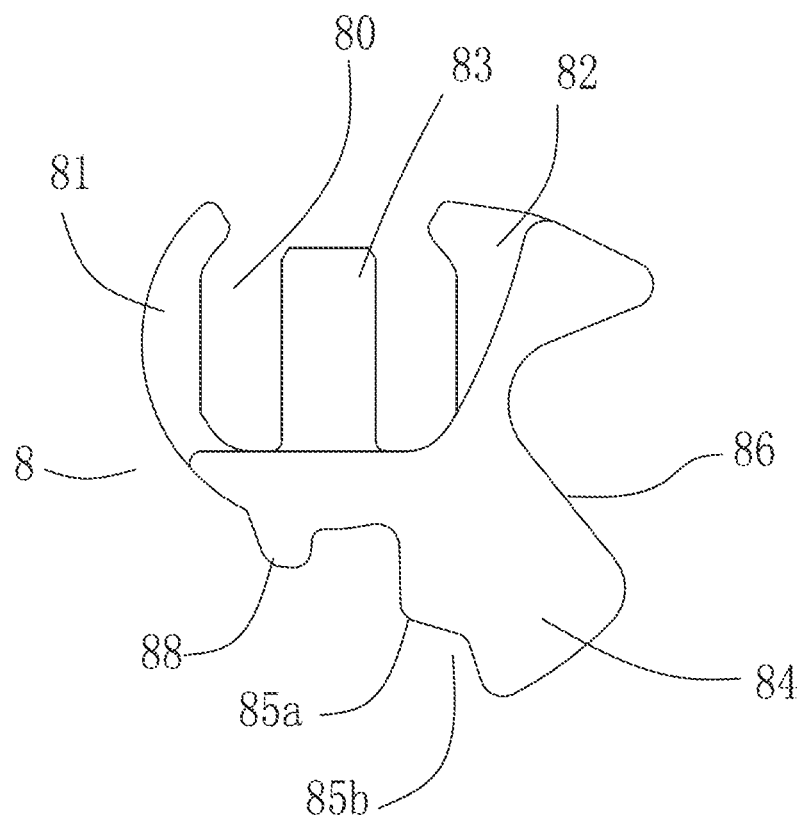
FIG. 8 shows a top view of the actuator of the valve according to the present invention.

FIGS. 7 and 8 show the structure diagram of the actuator 8 of the valve 100. As shown in FIGS. 7-8, the actuator 8 includes a fixed end 80 for connecting with the valve stem 2 and a guiding end 84 cooperating with the sliding member 3. The outer surfaces on both sides of the guiding end 84 are respectively provided with a pushing-out contour 85 and a pulling-back contour 86. The pushing-out contour 85 and the pulling-back contour 86 respectively cooperate with the opening guiding post and the pulling-back guiding post of the sliding member to realize movement transmission, which will be described in further detail below.

The pushing-out contour 85 is provided with an pushing-out portion 85a and a limit portion 85b in sequence, so that during the valve opening, the pushing-out portion 85a cooperates with the opening guiding post to push the sliding member 3 to move, thereby driving the valve disc 4 to make an opening movement, when the valve is completely opened, the opening guiding post of the sliding member disengages from the pushing-out portion 85a and enters into the limiting portion 85b. Preferably, the limiting portion is a groove. Between the fixed end 80 and the pushing-out contour 85, there is further provided an auxiliary pulling-back protrusion 88 protruding from the outer side wall of the actuator. During the valve closing, the auxiliary pulling-back protrusion 88 and the pulling-back contour 86 respectively cooperate with the opening guiding post 33 and the pulling-back guiding post 34 of the sliding member 3. The pulling-back contour 86 may be a curved surface or a flat surface.

The shape of the fixed end of the actuator 8 is substantially E-shaped, the upper and lower arms (elastic buckles) 81 and 82 of the E-shaped fixed end have a certain of elasticity, so that when the middle arm (positioning post) 83 of the actuator 8 is inserted into the positioning hole 106, the actuator 8 will not fall off from the positioning hole 106 without artificially disassembling. Specifically, the limiting step 105 on the valve stem 10 prevents the actuator 8 from moving in the axial direction of the valve stem. The elastic buckles 81 and 82 of the actuator 8 will have elastically rebounding force after the buckles are assembled, which always imparts the actuator 8 with the force for tightly holding the valve stem 10 so that the actuator 8 will not fall off. When the valve stem rotates, the actuator 8 will rotate synchronously with the valve stem 10, as long as the artificial force is greater than the elastic force of the elastic buckle during disassembling.

Preferably, a protrusion 87 is provided on the elastic buckle 82 of the actuator 8, so that the outer contour of the elastic buckle 82 exceeds the outer contour of the sliding member 3 after assembled.

Figure 9:
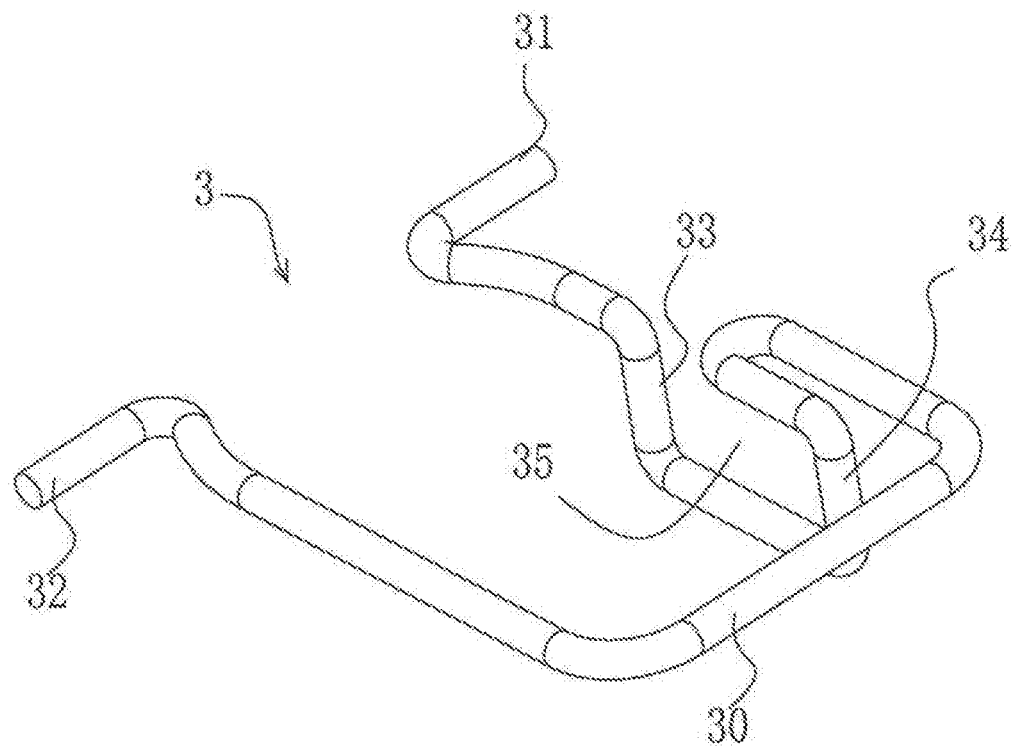
FIG. 9 shows a perspective view of an embodiment of the sliding member of the valve according to the present invention.
Figure 11:
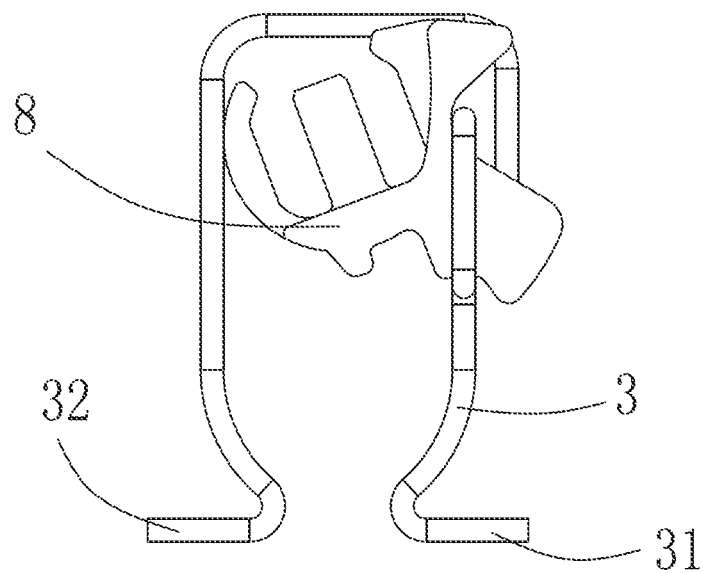
FIG. 11 shows a perspective view of the actuator and sliding member of the valve according to the present invention after assembled.

FIG. 9 shows a perspective view of the sliding member 3 of the first embodiment of the valve according to the present invention. As shown in FIG. 9, the sliding member 3 has a substantially U-shaped body 30, two arm ends of the body 30 are provided with rotating shafts 31 and 32 respectively. On one of the two arms of the sliding member 3, there is further provided with an opening guiding post 33 and a pulling-back guiding post 34, which are spaced apart from each other and extend downward from the U-shaped plane, thereby forming a substantially square-shaped structure together with the U-shaped body. Preferably, the sliding member is integrally formed by bending an elastic material. The opening guiding post 33 and the pulling-back guiding post 34 are located at appropriate positions of the U-shaped body 30, so that the opening guiding post 33 and the pulling-back guiding post respectively cooperate with the pushing-out contour and the pulling-back contour of the actuator, so as to realize the opening and closing of the valve. Specifically, as shown in FIG. 11, after assembled, the guiding end of the actuator extends into the square-shaped structure, so that during opening, the valve stem drives the actuator to rotate, and the opening guiding post of the sliding member cooperates with the pushing-out contour to drive the sliding member to move, then the sliding member drives the valve disc to rotate, thereby realizing the opening of the valve. During closing, the valve stem drives the actuator to rotate, the pulling-back guiding post of the actuator cooperates with the pulling-back contour to drive the sliding member to move, then the sliding member drives the valve disc to rotate, thereby realizing the closing of the valve.

Figure 10:
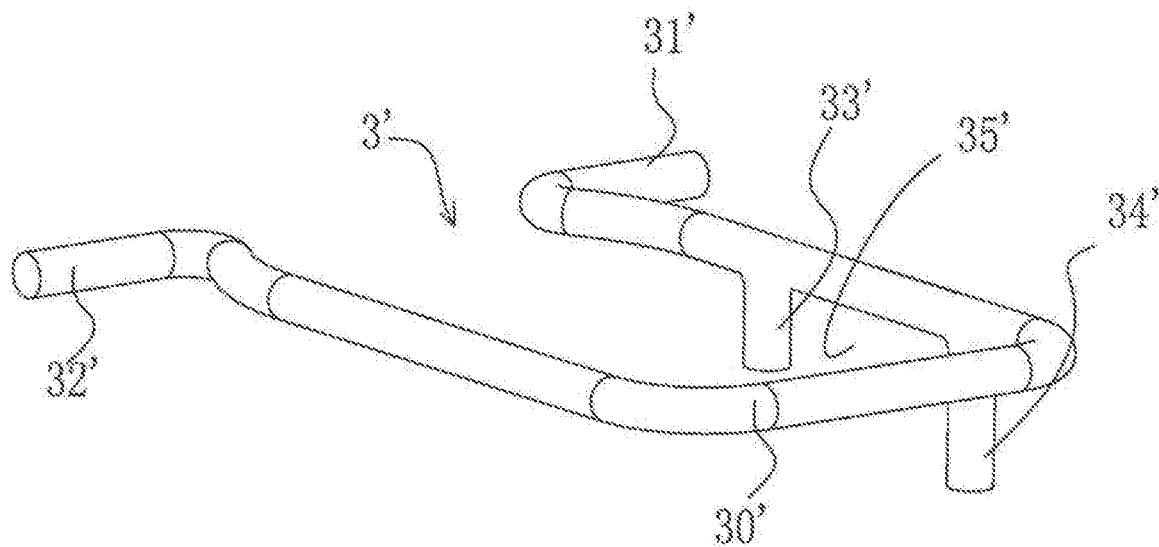
FIG. 10 shows a perspective view of another embodiment of the sliding member of the valve according to the present invention.

It should be pointed out that the sliding member may have various shapes as long as it has a rotating shaft connected to the valve disc as well as an opening guiding post and a pulling-out guiding post cooperating with the actuator. FIG. 10 shows a perspective view of the sliding member 3' of the second embodiment of the valve according to the invention. As shown in FIG. 10, the sliding member 3' has a substantially U-shaped body 30', two arm ends of the body 30' are provided with rotating shafts 31' and 32'. On one of the two arms on the sliding member 3', there is further provided an opening guiding post 33' and a pulling-out guiding post 34', which are spaced apart from each other and extend downward from the U-shaped plane, thereby forming a substantially square-shaped structure together with the U-shaped body. Here, the opening guiding post 33' and the pulling-back guiding post 34' for cooperating with the pushing-out contour and the pulling-back contour respectively are the same as that in the embodiment shown in FIG. 9, and will not be detailed hereafter.

Figure 12:
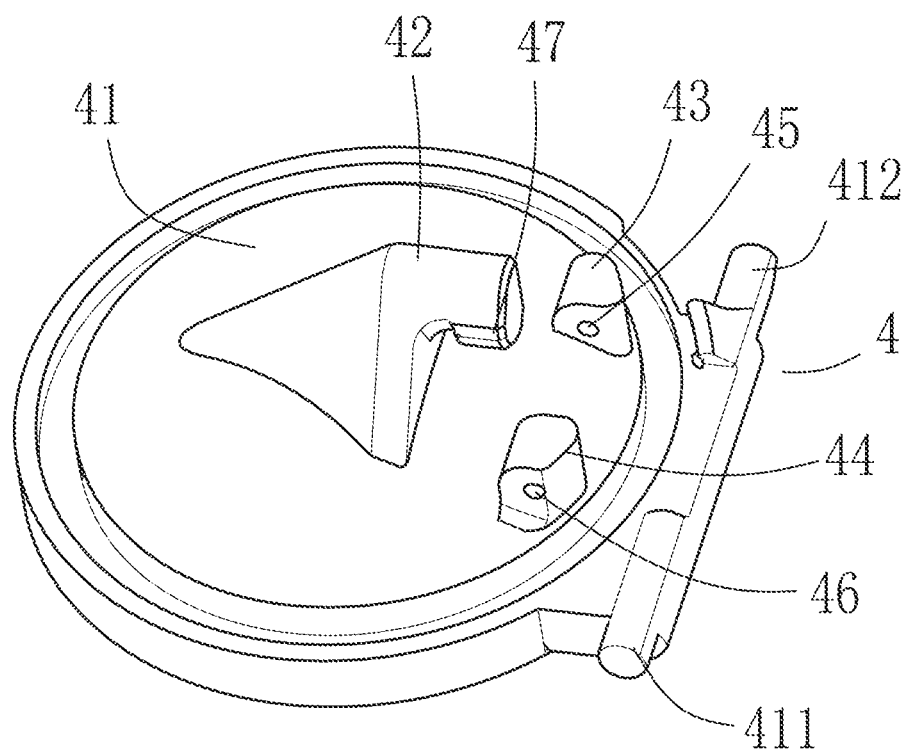
FIG. 12 shows a perspective view of the valve disc of the valve according to the present invention.
Figure 13:
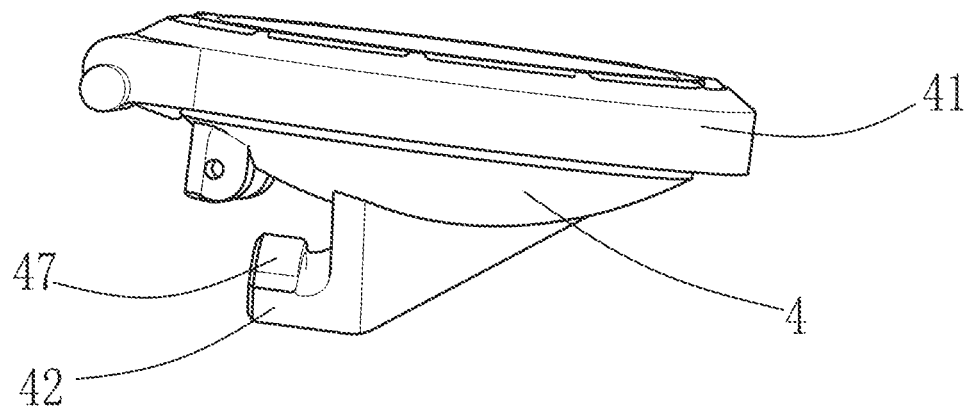
FIG. 13 shows another perspective view of the valve disc of the valve according to the present invention.
Figure 14:
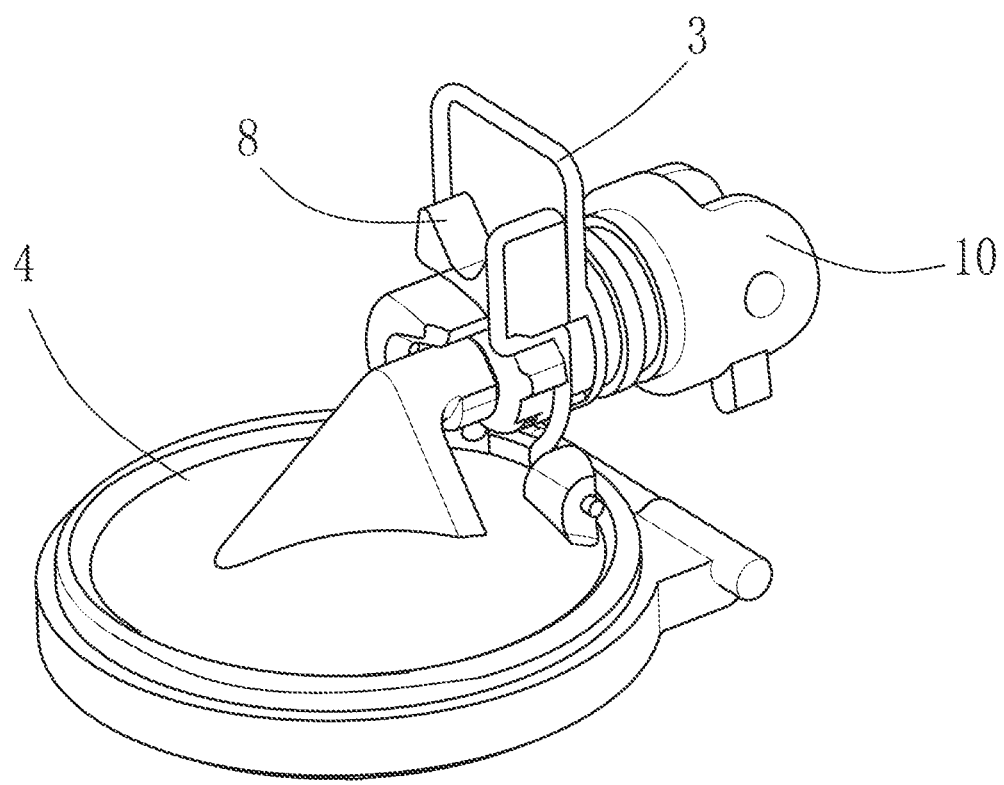
FIG. 14 shows a perspective view of the valve stem, valve disc, actuator and sliding member of the valve according to the present invention after assembled.

FIGS. 12-13 show a valve disc according to an embodiment of the present invention. As shown in FIGS. 12-13, the valve disc 4 has a disc-shaped body 41, and hinge shafts 411 and 412 are integrally provided on the outer periphery of the body 41. The side of the body 41 facing the passage 1a of the valve body is provided with a locking post 42, which is used to cooperate with the locking hook 104 on the valve stem 10, when locked, the locking post 42 and the locking hook 104 are interference fit. A locking boss 47 is further provided on the locking post 42. The locking boss 47 is located on the upper portion of the locking post 42 and protrudes outward relative to the locking post. In the valve closed state, the locking boss 47 engages with the locking-ledge 14 on the locking hook 104 to prevent the locking hook from disengaging from the locking post.

Above the locking post 42, two protrusions 43, 44 protrude from the side of the valve disc. The protrusions 43 and 44 are respectively provided with connecting holes 45 and 46 for accommodating the rotating shafts 31 and 32 of the sliding member 3.

When assembling, the valve stem 10 is partially accommodated in the valve stem hole 1d of the valve body 1, the actuator 8 is inserted into the positioning hole 106 in the valve stem. The guiding end of the actuator penetrates into the square-shaped structure or square opening on the sliding member, so as to cooperate with the opening guiding post 33 and the pulling-back guiding post 34. The hinge shaft on the disc 4 is mounted in the hinge hole of the valve body, the rotating shafts 31 and 32 on the sliding member 3 are inserted into the connecting holes 45 and 46 on the disc 4 respectively, since the sliding member has certain elasticity, after assembled, the sliding member 3 will not fall off from the valve disc without artificially disassembling.

Figure 15:
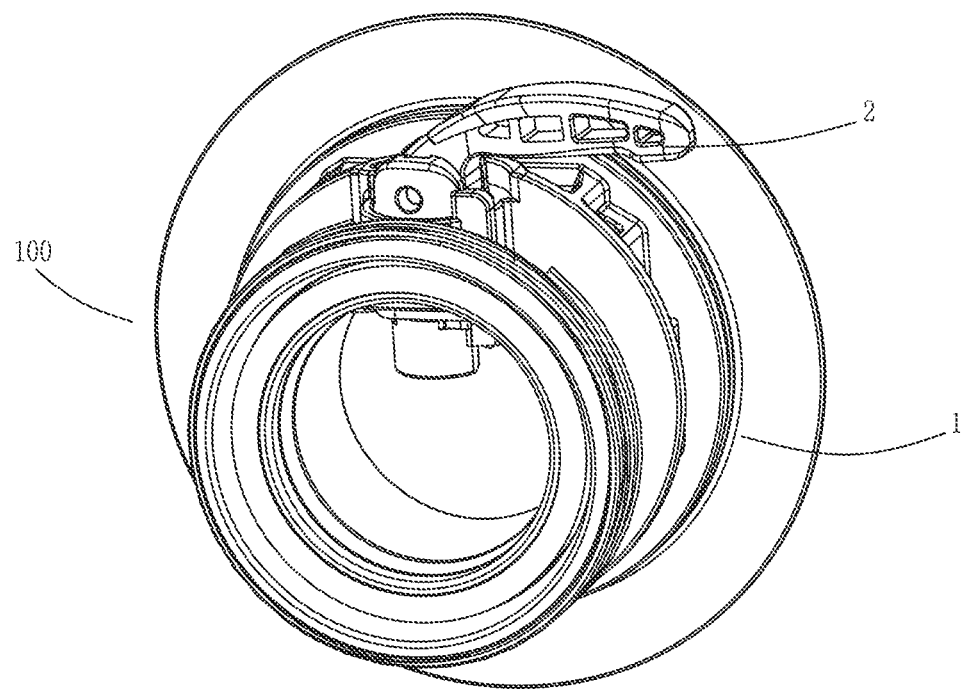
FIG. 15 shows a perspective view of the valve according to the present invention after assembled, wherein the valve is in an opened state.

FIG. 15 shows a perspective view of the valve 100 after assembled, wherein the valve is in an open state. After the assembly is completed, the rotation of the valve stem 10 drives the actuator 8 to rotate, the actuator 8 drives the sliding member 3 through cooperation of the pushing-out contour 85 and the pulling-back contour 86 with the guiding post 33 and the guiding post 34, thereby driving the valve disc to make opening and closing movement.

Figure 16:
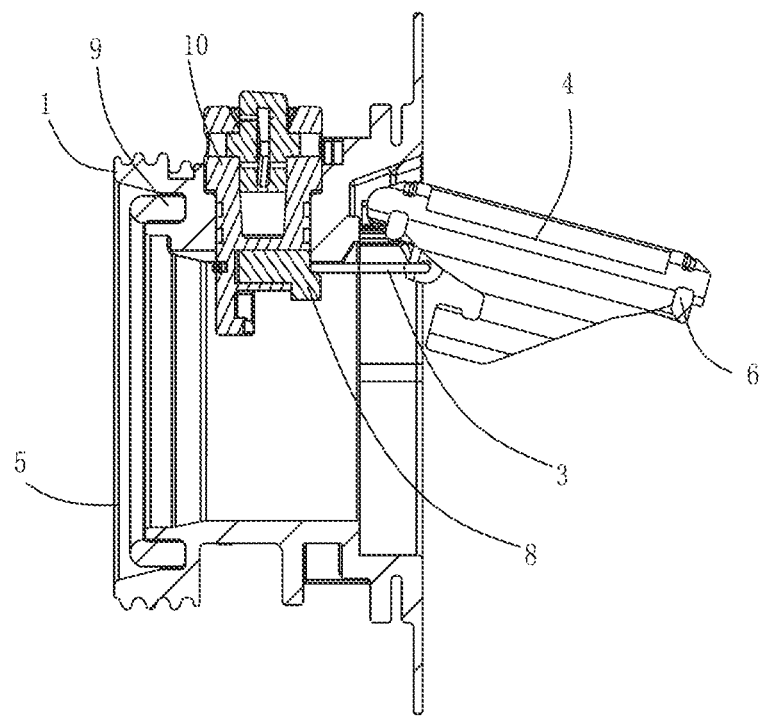
FIG. 16 is a cross-sectional view of the valve of FIG. 15.

FIG. 16 shows a cut-away side view of the valve 100 in an open state after assembled. As shown in FIG. 16, the valve stem 10 is partially accommodated in the valve stem hole 1d of the valve body 1 and is rotatably held on the valve body 1. The hinge shafts 411 and 412 on the valve disc 4 are respectively inserted into the hinge holes 1g and 1h on the valve body 1, so that the valve disc 4 is able to rotate around the central axis of the hinge hole. The valve stem 10 is connected to the valve disc 4 through the actuator and the sliding member 3 made of wire spring, so that when the valve stem 10 is rotated, the valve stem 10 drives the sliding member 3 to move and then drives the valve disc 4 to move, thereby opening or closing the valve disc.

Figure 17:
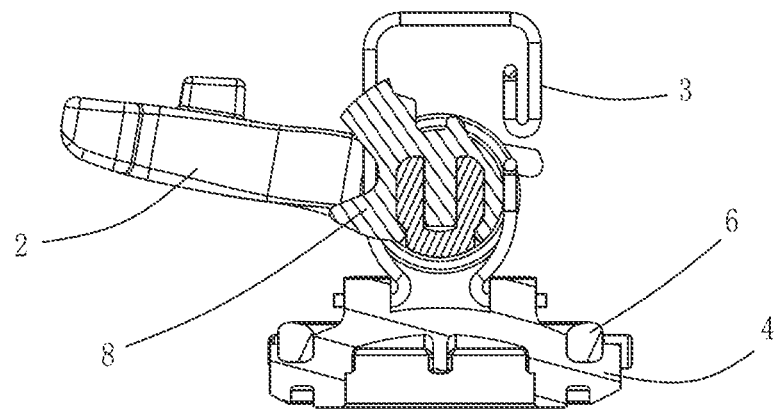
FIGS. 17, 18 and 19 are cross-sectional views showing the opening process of the valve of the present application, wherein the valve of FIG. 17 is in a closed state, the valve of FIG. 18 is in a half-opened state, and the valve of FIG. 19 is in a fully opened state.
Figure 18:
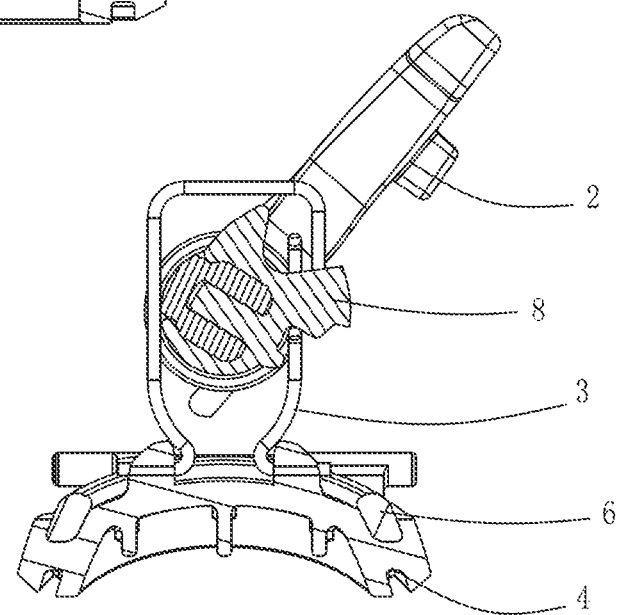
Figure 19:
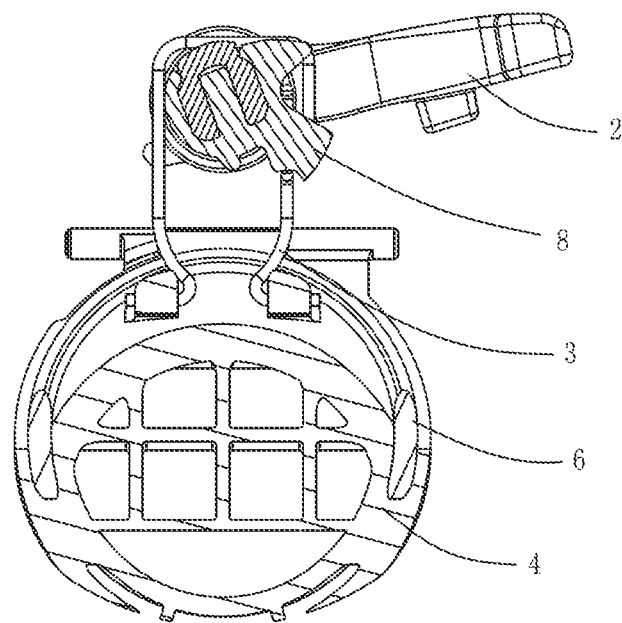

FIGS. 17, 18 and 19 are cross-sectional views showing the opening process of the valve of the present application. As shown in FIGS. 17-19, when the valve is opened, the valve stem 10 is rotated in the opposite direction, so that the locking hook 104 of the valve stem 10 is firstly disengaged from the locking pin 42 on the valve disc 4. Then the valve stem 10 is further rotated, the valve stem 10, the actuator 8, and the sliding member 3 constitute a transmission mechanism, the pushing-out contour of the actuator 8 exerts a force on the opening guiding post of the sliding member, then the sliding member 3 pushes the valve disc 4 away, causing the valve disc 4 open to fully opened state.

Figure 20:
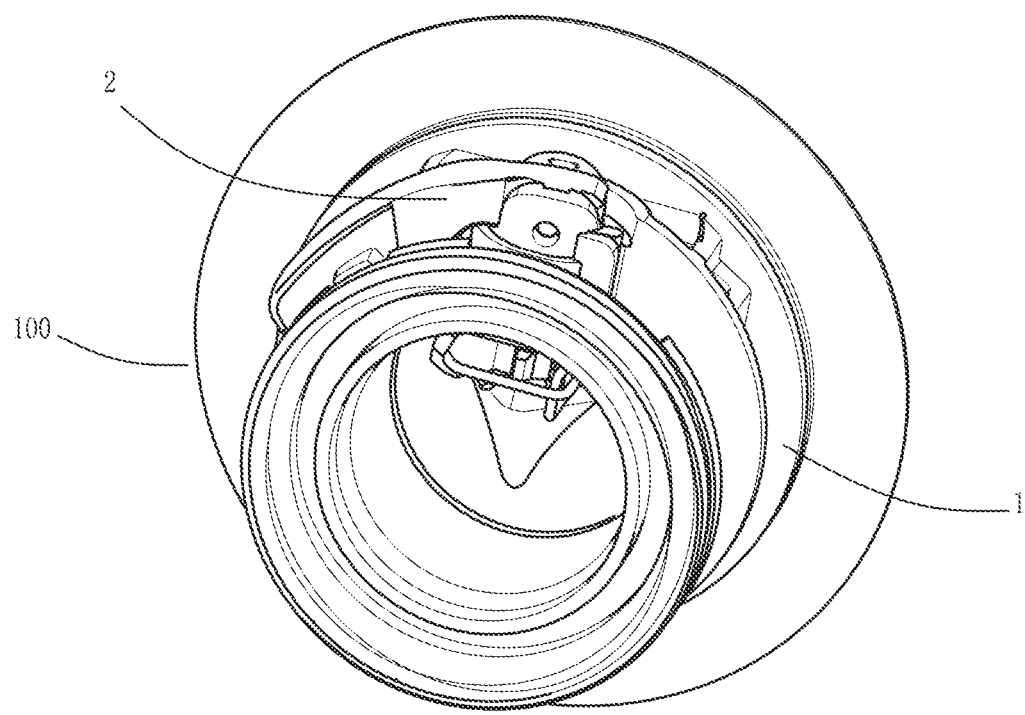
FIG. 20 shows a perspective view of the assembled valve according to the present invention, wherein the valve is in a closed state.

FIGS. 20 and 2 respectively show a perspective view and a cross-sectional view when the valve is in a closed state. When the valve is closed, the valve stem 10 rotates toward the closed state, the valve stem 10, the actuator 8 and the sliding member 3 constitute a transmission mechanism, the pulling-back contour of the actuator exerts a force on the pulling-back guiding post of the sliding member, so that the sliding of the sliding member 3 along the actuator 8 pulls the valve disc 4 to abut against the valve body 1, making the valve disc 4 in a pre-closed state. With continually rotating the valve stem 10, when the locking post 42 contacts with the starting inclined surface 104a of the locking hook 104, under the action of the starting inclined surface 104a, the locking hook will exert an inward straining force on the locking post's surface. When the locking post 42 is pulled to the middle portion 104b, at this time, the side surface of the locking post 42 is snugly fit on the middle portion 104b of the locking hook 104, and the locking boss 47 on the locking post 42 is engaged with the locking-ledge 14 on the locking hook 104. At this time, the sealing ring 6 is compressed to achieve sealing and prevent the locking hook from intentionally disengaging from the locking post.

In the above-mentioned embodiment, since the valve disc and the valve body are connected in a hinged manner, the valve disc can rotate about the central axis of the hinge to realize the opening and closing of the valve. In the open state, there is no blocking member in the fluid passage in the valve body, so a large flow can be achieved. Moreover, by appropriately setting the transmission ratio of the operating means and the transmission means, the valve can be opened with high efficiency, for example, the valve stem can be completely opened and closed only by rotating a small angle. In addition, due to the hinge connection, the structure of the valve is simple and compact, the valve can be operated easily with small opening and closing torque to open by large opening angle, allowing large flow, and is convenient to clean, and the manufacturing cost thereof is low. Through the cooperation of the locking boss and the locking hanger, the valve can be prevented from being opened intentionally. Furthermore, by arranging reinforced flanges, force-relieving grooves, reinforced protrusions and other structures on the valve body, the strength of the valve can be increased without substantially increasing the total volume of the valve, and prevent intentional leakage due to insufficient strength of the valve and partial deformation of the flange. In addition, by offsetting the sealing surface of the valve backward, the deformation of the sealing portion can be prevented, and intentional leakage of the valve can be further prevented.

It should be pointed out that in the above-mentioned embodiments, each member may have various modifications. For example, the handle and the valve stem may be an integral member. The hinge connection between the valve disc and the valve body may also be implemented by providing a hinge hole on the valve disc and providing a hinge pin on the valve body.

In addition, the actuator and the sliding member may also have other configurations, as long as the sliding member is provided with a rotating shaft for rotatably connecting with the connecting hole of the valve disc, and the actuator and the sliding member are respectively provided with guiding structures that can cooperate with each other, such as a guiding contour and the guiding post, and can move synchronously with the valve stem. The guiding contour may be provided on the actuator, and the guiding post is provided on the sliding part; or the guiding contour may also be provided on the sliding member, and the guiding post is correspondingly provided on the actuator. The actuator and the valve stem may be formed as a one-piece member.

The preferred embodiments of the present invention have been described in detail above, but it should be understood that, if necessary, aspects of the embodiments can be modified to adopt aspects, features, and concepts of various patents, applications, and publications to provide additional embodiments.

Considering the detailed description above, these and other changes can be made to the embodiments. Generally speaking, in the claims, the terms used should not be considered as limited to the specific embodiments disclosed in the specification and claims, but should be understood as including all possible embodiments together with all equivalent scope of the claims.

The invention claimed is:

1. An hinged valve comprising a valve body, a valve stem, a valve disc, an actuator, and a sliding member, wherein the valve body is a housing which is provided with a valve stem hole for partially accommodating the valve stem, and the valve body has a passage with an inlet and an outlet; the valve disc is connected to the valve body through a hinge, so that the valve disc is rotatable around a rotation axis of the hinge, wherein the actuator cooperates with the sliding member, so that the rotational movement of the valve stem is transmitted to the valve disc through the actuator via the sliding member and is converted into a movement that drives the valve disc to rotate around the rotation axis of the hinge to open or close the valve, wherein the valve disc is provided with a locking post, a bottom end of the valve stem is provided with a locking hook, and the locking post is provided with a locking boss, the locking hook is provided with a locking-ledge, when the valve is in the closed state, the valve disc is locked to the valve body by the locking hook and the locking post, and the locking-ledge on the locking hook and the locking boss on the locking post cooperate with each other.

2. The hinged valve according to claim 1, wherein the locking boss is located on an upper portion of the locking post and protrudes outward relative to the locking post, and the locking-ledge extends from a lower portion of the locking hook transversely to the locking hook.

3. The hinged valve according to claim 1, wherein an outer edge of the locking-ledge is an arc-shaped curved surface, and a middle portion of the outer edge is concave relative to both sides.

4. The hinged valve according to claim 1, wherein the valve body has a flange located at one end of the valve body; the valve body is further provided with a reinforcing protrusion extending radially outward along the valve body; and a force-relieving groove is provided between the reinforcing protrusion and the flange.

5. The hinged valve according to claim 4, wherein a width of the force-relieving groove is ⅕-½ of a thickness of the reinforcing protrusion.

6. The hinged valve according to claim 1, wherein a thickness of a root of the flange is greater than that of a distal end of the flange.

7. The hinged valve according to claim 4, wherein a thickness of a root of the flange is 1.5-2.5 times that of a distal end of the flange.

8. The hinged valve according to claim 4, wherein a thickness of a reinforcing platform of the flange is greater than that of a distal end of the flange.

9. The hinged valve according to claim 4, wherein an inside of the valve body is provided with a sealing surface facing the valve disc, wherein the sealing surface is closer to the outlet of the valve than the reinforcing protrusion.

10. The hinged valve according to claim 9, wherein an auxiliary pulling-back protrusion protruding from the outer side wall of the actuator is further provided between the fixed end and the pushing-out contour, wherein the auxiliary pulling-back protrusion and the pulling-back contour respectively cooperate with the opening guiding post and the pulling-back guiding post during the valve closing.

11. The hinged valve according to claim 1, wherein the actuator includes a fixed end for connecting with the valve stem and a guiding end that cooperates with the sliding member, the outer surfaces on both sides of the guiding end are respectively provided with the pushing-out contour and the pulling-back contour.

12. The hinged valve according to claim 11, wherein the actuator includes a fixed end for connecting with the valve stem and a guiding end that cooperates with the sliding member, and the outer surfaces on both sides of the guiding end are respectively provided with the pushing-out contour and the pulling-back contour; and an auxiliary pulling-back protrusion protruding from the outer side wall of the actuator is further provided between the fixed end and the pulling-back contour, wherein the auxiliary pulling-back protrusion and the pulling-back contour respectively cooperate with the opening guiding post and the pulling-back guiding post during closing of the valve.

13. The hinged valve according to claim 11, wherein a thickness of a root of the flange is greater than that of a distal end of the flange.

14. The hinged valve according to claim 11, wherein an inside of the valve body is provided with a sealing surface facing the valve disc, wherein the sealing surface is closer to the outlet of the valve than the reinforcing protrusion.

15. The hinged valve according to claim 1, wherein the actuator is provided with a pushing-out contour and a pulling-back contour, and the sliding member is rotatably connected with the valve disc and is provided with an opening guiding post and a pulling-back guiding post that respectively cooperate with the pushing-out contour and the pulling-back contour; the pushing-out contour cooperates with the opening guiding post during opening of the valve, so that the rotational movement of the valve stem is transmitted to the valve disc through the actuator via the sliding member and is converted into the movement that drives the valve disc to rotate around the rotation axis of the hinge to open the valve; the pulling-back contour cooperates with the pulling-back guiding post during the valve closing, so that the rotational movement of the valve stem is transmitted to the valve disc through the actuator via the sliding member and is converted into the movement that drives the valve disc to rotate around the rotation axis of the hinge to close the valve.

16. An hinged valve comprising a valve body, a valve stem, a valve disc, an actuator and a sliding member, wherein the valve body is a housing which is provided with a valve stem hole for partially accommodating the valve stem, and the valve body has a passage with an inlet and an outlet, the valve disc is connected to the valve body through a hinge so that the valve disc is rotatable around a rotation axis of the hinge, and the valve disc is provided with a locking post, a bottom end of the valve stem is provided with a locking hook, wherein the actuator is provided with a pushing-out contour and a pulling-back contour and is connected with the valve stem to form a relatively stationary assembly capable of moving synchronously; the sliding member is rotatably connected to the valve disc and is provided with an opening guiding post and a pulling-back guiding post that respectively cooperate with the pushing-out contour and the pulling-back contour, wherein the locking post is provided with a locking boss, and the locking hook is provided with a locking-ledge, wherein the pushing-out contour cooperates with the opening guiding post during the valve opening, so that a rotational movement of the valve stem is transmitted to the valve disc through the actuator via the sliding member and is converted into the movement that drives the valve disc to rotate around the rotation axis of the hinge to open the valve; the pulling-back contour cooperates with the pulling-back guiding post during the valve closing, so that the rotational movement of the valve stem is transmitted to the valve disc through the actuator via the sliding member and is converted into the movement that drives the valve disc to rotate around the rotation axis of the hinge to close the valve, when the valve is in the closed state, the valve disc is locked to the valve body by the locking hook and the locking post, and the locking-ledge on the locking hook and the locking boss on the locking post engage with each other;

the locking boss is located on an upper portion of the locking post and protrudes outward relative to the locking post, and the locking-ledge extends from a lower portion of the locking hook transversely to the locking hook; and the valve body has a flange located at one end of the valve body, the valve body is further provided with a reinforcing protrusion radially extending outward along the valve body, and a force-relieving groove is provided between the reinforcing protrusion and the flange.

* * * * *